(12) United States Patent
Wieder

(10) Patent No.: US 6,854,705 B2
(45) Date of Patent: Feb. 15, 2005

(54) FLOW CONTROL VALVE THAT MAY BE USED FOR MOLD TEMPERATURE CONTROL SYSTEMS

(75) Inventor: Horst K. Wieder, Watertown, WI (US)

(73) Assignee: CITO Products, Inc., Watertown, WI (US)

( * ) Notice: Subject to any disclaimer, the term of this patent is extended or adjusted under 35 U.S.C. 154(b) by 238 days.

(21) Appl. No.: 10/235,283

(22) Filed: Sep. 5, 2002

(65) Prior Publication Data

US 2004/0046135 A1 Mar. 11, 2004

(51) Int. Cl.⁷ .............................................. F16K 31/143
(52) U.S. Cl. ...................................... 251/63.6; 251/62
(58) Field of Search .................................. 251/62–63.6

(56) References Cited

U.S. PATENT DOCUMENTS

| | | |
|---|---|---|
| 4,354,812 A | 10/1982 | Wieder et al. |
| 4,420,446 A | 12/1983 | Wieder et al. |
| 4,483,236 A | 11/1984 | Curtiss |
| 4,526,341 A | 7/1985 | Thomas ..................... 251/63.5 |
| 4,821,776 A | 4/1989 | Ariizumi et al. |
| 4,844,176 A | 7/1989 | Podsobinski |
| 6,102,072 A | 8/2000 | Yokota et al. |
| 6,129,332 A | 10/2000 | Dusterhoft |
| 6,276,610 B1 | 8/2001 | Spoolstra |
| 6,312,628 B1 | 11/2001 | Wieder et al. |
| 6,491,059 B2 * | 12/2002 | Kajitani ..................... 137/530 |
| 2001/0006077 A1 | 7/2001 | Matsuura et al. |
| 2001/0019116 A1 * | 9/2001 | Fukano et al. ............. 251/63.6 |

OTHER PUBLICATIONS

Yokota Manufacturing Co., Ltd., Non–Water Hammer Check Valve (Mar. 21, 2002), available at http://www.aquadevice.com/english/04valve₁₃slsn2.htm.

* cited by examiner

*Primary Examiner*—J. Casimer Jacyna
(74) *Attorney, Agent, or Firm*—Foley & Lardner LLP

(57) ABSTRACT

A valve is formed to resist snap-action closure forces and provides a smooth closing action to minimize or eliminate water hammer. The valve is opened and closed by modulating the relative air pressures above and below a piston in the valve. Because the air pressures above and below the piston produce partially offsetting forces on the piston, the net closure force on the valve plunger is limited, and the rate of valve closure is reduced enough to achieve the effect of minimizing water hammer. A separate vent port volume may vent to atmosphere to further limit valve closure speed, and to further reduce water hammer. The valve can provide the capability to control the flow of fluids over a wide temperature range over a long service life while reducing or eliminating water hammer. The valve is well suited for use in injection mold temperature control systems.

13 Claims, 3 Drawing Sheets

FLOW CONTROL VALVE THAT MAY BE USED FOR MOLD TEMPERATURE CONTROL SYSTEMS

FIELD OF THE INVENTION

This invention relates generally to plastics injection mold temperature control systems and to valves capable of controlling the flow of coolant in an injection mold temperature control system.

BACKGROUND OF THE INVENTION

The flow of coolant (typically water) through the mold of plastics injection molding systems requires valves capable of rapidly controlling fluid flow over a wide temperature range. Injection molding is a well-known process which may be used for the fabrication of complexly-shaped plastic (or metal) parts. In the injection molding process, a molten plastic material is introduced into a mold and allowed to set or cure by cooling. Once the plastic is set or cured, the mold is opened, and the molded part is released. The temperature of the injection mold is preferably controlled so that the mold is at the proper temperature when the mold material is injected into the mold such that the object formed in the mold is set or cured at a rate that maintains the quality of the molded object while minimizing the setting or curing time to maximize production rates. Initially, an injection mold should be brought up to a steady-state operating temperature that is ideal for the particular molding operation. This can be achieved at start-up by, for example, forming a few scrap parts using heat from the liquid plastic to warm the mold or introducing heated water into channels within the mold. As hot molten material is injected into a mold, the mold absorbs heat from the molten material which must be removed from the mold to maintain the mold temperature within the ideal operating range. If heat is not removed at a sufficient rate, the mold temperature will tend to increase as a series of objects are successively molded. Mold temperature regulation is therefore generally desirable to maintain the temperature of an injection mold, both to minimize shrinkage and distortion during the setting or curing process and to ensure uniformity among a series of molded objects in a production run. Temperature control of an injection mold is typically accomplished by circulating cooling fluid through channels fashioned in the walls of the mold. The temperature of the mold initially increases upon the introduction of the hot molten material, but is restored to the desired operating temperature by the circulation of the cooling fluid through the channels in the mold. More precise control may be achieved through the use of multiple channels to circulate coolant through multiple zones in the mold.

Methods and devices for controlling the temperature of a fluid-cooled injection mold without the need for a continuous flow of cooling fluid are described in U.S. Pat. Nos. 4,354,812 and 4,420,446 to Horst K. Wieder. These patents describe methods by which an injection mold can be maintained at a desired operating temperature using a cooling fluid. Accurate control of the temperature of an injection mold can be achieved by mounting a temperature sensor onto or within the mold and using valves to control the flow of coolant based on the sensed mold temperature.

Water or petroleum based cooling fluids are commonly used for heat transfer in injection molding systems. A high-temperature injection molding process may involve normal mold temperatures in excess of 300° F., with molten material injected into the mold typically at a much higher temperature, e.g., 700° F., or higher. It is therefore necessary that the elements that carry the heat transfer fluids be capable of reliable service when exposed to fluids within these temperature ranges.

Controlling the flow of pressurized high-temperature fluids such as, for example, water, demands rugged valve construction. This is particularly true where long valve service life is required. Such valve design can be made even more demanding in applications in which the valve must also control large flow rates of fluids having wide temperature ranges. Such high-capacity valves may also be subject to the effects of water hammer when they close rapidly.

The operation of valves controlling the flow of pressurized heat transfer fluids will often lead to water hammer effects. Water hammer is a phenomenon related to the back pressure wave that results from an abrupt change in the flow rate of a fluid. The back pressure wave travels from the point where the flow was interrupted back towards the source of the flow. This can stress and damage hoses, pipes, joints, pumps and seals throughout the fluid system. Since the fluid is often pressurized within the system, leaks can result and lead to damage to equipment, controls, materials, and people in the area, in addition to causing costly down-time.

Water hammer is often dealt with by suppression measures that include such things as adding check valves or risers to limit or attenuate the back pressure wave, or to confine it to a particular area of the fluid system. However, these suppression devices, in addition to increasing cost, size, and weight, often introduce additional seals that must be maintained. Furthermore, over time, the gas in a riser dissolves into the fluid; consequently, the use of risers requires that the system be drained on a routine basis to maintain its water hammer suppression capability. Other mitigation techniques include increasing the pipe diameter to reduce the fluid flow velocity; however, such mitigation suppression techniques can add significant cost and require extra space.

Rapid valve closure can directly cause water hammer. Within a typical valve controlling a pressurized fluid flow, the plunger naturally tends to snap shut. As the plunger closes, fluid flow becomes restricted; but, before flow is entirely shut off, the velocity of the fluid around the plunger increases, causing a corresponding decrease in pressure that naturally leads to an accelerating closure force on the plunger. The resulting snap action tends to decrease the time it takes to interrupt the fluid flow, and it tends to produce a sharp step-like reflected pressure wave, i.e., water hammer.

SUMMARY OF THE INVENTION

In accordance with the present invention, a valve for control of coolant provides the capability of controlling the flow of cooling fluids over a wide temperature range and exhibits long service life while reducing or eliminating the production of water hammer. Furthermore, a distribution system including a plurality of valves in accordance with the present invention can be advantageously used in a plastics injection mold temperature control system which is capable of controlling heat transfer fluids to regulate the temperature of a plurality of channels in a mold. A controller can be used to operate such valves by using high and low pressurization states.

Use of the fluid control valve of the invention with reduced water hammer is particularly advantageous in complex pressurized hydraulic systems such as injection molding systems. By reducing water hammer, the mean time between failure of components in the pressurized fluid supply lines, including valves, seals, and pumps, can be increased. The valves themselves will have increased service life because of the elimination or reduction of water hammer. The benefits include cost recovery accruing from reduced maintenance, extended service life, and increased operational production throughput time. Further, the suppression methods typically employed for reducing water hammer, as discussed above, can be minimized or eliminated. In addition to avoiding the creation of water hammer, the valve of the present invention can be ruggedly designed for high capacity and long service life while controlling pressurized fluids, such as water, at high-temperatures and high flow rates.

The valve of the invention is constructed to resist snap-action closure force, and provides a smooth closing action that can minimize or eliminate water hammer. The valve is opened and closed by modulating the relative air pressures above and below a control piston that is connected to operate a plunger. By providing nearly offsetting forces above and below the control piston to transition from open to closed, the net closure force on the plunger is limited such that the velocity and acceleration of the plunger are small enough to achieve the desired effect of minimizing water hammer.

In a preferred embodiment of the valve of the invention, the control piston and two slideable seals define three independent volumes of air in a piston chamber: an upper piston volume, connectable via an upper pressure port to a first air pressure line; a lower piston volume, connectable via a lower pressure port to a second air pressure line; and a vent port volume having a vent port. The vent port can be open to ambient air during the steady-state time between transitions so that the vent port volume reaches ambient pressure. In a preferred embodiment of the invention, the vent port volume pressure experiences transient increases due to the use of a flow restrictor that may be attached to the vent port. When the vent port restrictor is used, the vent port volume pressure acts to resist piston movement, thereby resulting in reduced acceleration and velocity of valve plunger transitions. During the steady-state time between transitions, the vent port restrictor permits pressure in the vent port volume to equalize to ambient air pressure.

In addition, having a vent port in the valve body which can be open to the ambient atmosphere provides the ability to detect leaks within the valve, such as from worn out shaft seals around the valve stem. Leaks in such seals may be detected by observing liquid leaking from the vent port and accumulating, for example, in a drip pan. In a further preferred embodiment, a hose can be attached to the vent port such that the leaking fluid can be directed to a convenient collection point. This capability is valuable because it enables simple and low-cost monitoring of valve shaft seal integrity without unnecessary preventative maintenance and without the need to open the pressure control lines to look for evidence of leaks.

In one preferred embodiment, the upper pressure port and the lower pressure port may be supplied from two separate air pressure sources. Alternatively, these two ports may be supplied from the same air pressure source, with one of the pressure ports disconnectable from the pressure source by use of a modulating device such as, for example, a three-way valve. Where such a valve is used, the pressure may be reduced to one port to cause a valve transition from open to closed or vice versa. When activated, such a valve may, for example, release the pressure on one of the pressure ports to ambient air pressure.

In a preferred embodiment, the valve is normally closed when no pressure is applied. When the valve is closed, the plunger engages a valve seat and seals a hydraulic inlet port from a hydraulic outlet port such that fluid from the inlet port cannot reach the outlet port. The valve is preferably normally closed when no pressure is applied to either of the two pressure ports or to the hydraulic inlet port because of a piston spring that provides a closing force. The valve will remain closed until pressurized fluid from the hydraulic inlet port overcomes the pressure exerted by the piston spring. When pressure is applied to the two pressure ports, an additional closing force is applied because the area of the top of the piston exposed to the upper piston volume is preferably greater than the area of the bottom of the piston exposed to the lower piston volume, thereby producing a net downward force on the piston and on the plunger connected thereto. The valve carries out a transition from closed to open, for example, when the relative pressure in the upper piston chamber is reduced, such as by releasing the pressure in the upper piston volume to ambient pressure level. Resupplying pressure to the upper pressure port will cause the valve to smoothly close since the pressure in the lower piston volume will reduce the closure rate. This gradual closure will help prevent the rapid increase in back pressure in the hydraulic line connected to the hydraulic inlet port that could otherwise produce a water hammer effect.

A cooling fluid distribution system in accordance with the present invention includes a manifold connecting a plurality of the valves. Such a system may have a selected number of such valves. Four valves may be advantageously used in a system such as in an injection mold temperature control system. Preferably, a pair of valves may be operated in coordination such that one of the two valves controls the supply fluid flow to a mold and the second valve controls the return fluid flow from the mold. Furthermore, a plurality of valve pairs may be operated in coordination such that each pair of valves controls fluid flow to a different channel in the mold. Such a plurality of valves in a fluid distribution system simplifies routing and connection of valves to both the air pressure lines and the hydraulic supply and return lines.

The distribution system may include multiple connected sets of valves, with each set of valves connected to a distribution manifold. Each manifold preferably distributes fluid flow to at least one channel in a mold for the purpose of regulating the temperature of that channel and the adjacent material in the mold. A controller may be utilized to control the state of the valves. Preferably, the controller controls two valves in coordination, such as, for example, by simultaneous actuation of a supply valve and a return valve that together control the flow of a heat transfer fluid to a channel in a mold.

Water is a preferred hydraulic fluid for controlled mold cooling in accordance with the present invention. The present invention may also be used advantageously to control flow of other fluids, such as petroleum-based oils or synthetic heat transfer fluids.

Further objects, features, and advantages of the invention will be apparent from the following detailed description when taken in conjunction with the accompanying drawings.

DETAILED DESCRIPTION OF THE INVENTION

Figure 1:
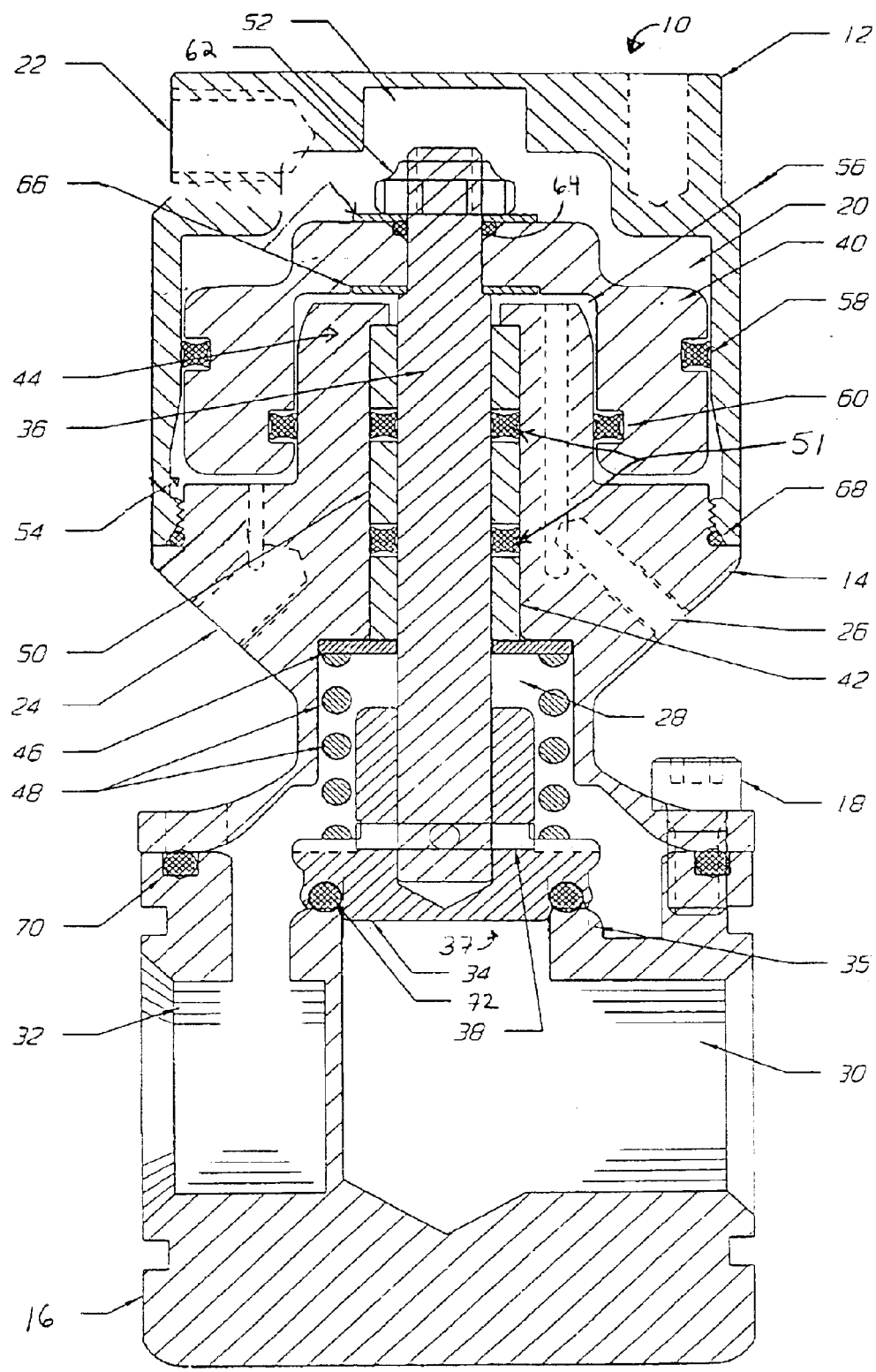
FIG. 1 is a cross-sectional view of a valve in accordance with the present invention, shown in the closed position.

Referring to the drawings, a valve in accordance with the present invention is shown generally at 10 in cross-section in FIG. 1. The valve 10 includes a top housing 12 that is connected to a valve body housing 14. The valve body housing 14 is further connected to a valve mount 16, preferably attached using mounting hardware such as, for example, at least one mounting screw 18. The top housing 12 has internal surfaces defining a piston chamber 20. In fluid communication with the piston chamber 20 are an upper pressure port 22, a lower pressure port 24, and a vent port 26. The valve body housing 14 and the valve mount 16 have internal surfaces that together define a plunger chamber 28. The valve mount 16 has a hydraulic inlet port 30 and a hydraulic outlet port 32.

A valve plunger 34 is slideably disposed within the plunger chamber 28. When the valve plunger 34 is in the closed position engaged against a valve seat 35, pressurized fluid is blocked from flowing from the hydraulic inlet port 30 to the hydraulic outlet port 32 through the central opening 37 of the valve seat 35. The valve plunger 34 is fixed to one end of a valve stem 36 by a plunger pin 38. The valve plunger 34, when actuated from the closed position to the open position, moves upwardly within the plunger chamber 28 in response to net upward force on the valve stem 36. Opposite the valve plunger 34, the other end of the valve stem 36 is rigidly attached to a piston 40 that is slideably disposed in the piston chamber 20. The valve stem 36 is slideably disposed between the plunger chamber 28 and the piston chamber 20 through a valve stem channel 42 defined by the valve body housing 14. An extended portion of the valve stem channel 44 extends above the bottom surface of the piston chamber 20, forming a hollow cylindrical member. The piston 40 has internal surfaces defining a corresponding cylindrical walled cup shape, adapted for slideably encompassing the extended portion of the valve stem channel 44 when the piston 40 is downwardly disposed. The valve stem channel 42 is sealed from fluid in the plunger chamber 28 by a spring washer 46 around the opening of the valve stem channel 42 in the plunger chamber 28, the spring washer 46 being held in place by a piston spring 48 that is preferably under compression and biases the plunger 34 toward its closed position. In addition, the valve stem channel 42 is also guided by shaft bearings 50 disposed around the valve stem 36 substantially along the length of the valve stem channel 42. These bearings permit the valve stem 36 to slide axially within the valve stem channel 42. In addition, the valve stem channel 42 is also sealed by at least one, but preferably two, shaft seals 51 disposed around the valve stem 36 at intervals along the length of the valve stem channel 42. These shaft seals 51 permit the valve stem 36 to slide axially within the valve stem channel 42, but they prevent fluid in the plunger chamber 28 from passing through the valve stem channel 42 up into vent port volume 56.

Within the piston chamber 20, two slideable seals define with the piston 40 three independently sealed volumes: an upper piston volume 52 above the top surface of the piston 40; a lower piston volume 54 below the bottom surface of the piston 40; and, a vent port volume 56 below the piston 40 around the valve stem 36 that is separate from the lower piston volume 54. A piston OD (outer diameter) seal 58 attaches to an inner sidewall of the piston chamber 20 and forms a slideable seal with the outer cup surface of the piston 40. The OD seal 58 thus separates the upper piston volume 52 from the lower piston volume 54. A rod quad ring seal 60 attaches to an extended portion of the valve stem channel 44 and forms a slideable seal with the inner cup surface of the piston 40. The rod quad ring seal 60 thus separates the lower piston volume 54 from the vent port volume 56.

The piston 40 actuates the valve stem 36 in response to changes in pressure existing above and below the piston 40. The upper piston volume 52 is capable of being pressurized through the upper pressure port 22. The lower piston volume 54 is capable of being pressurized through the lower pressure port 24. The vent port volume 56 is in fluid communication with the vent port 26. Each of these ports may have appropriate means for connecting to a pressurized air line. In the case of the vent port 26, a pressure restriction element may be connected between the vent port volume 56 and ambient air pressure.

The valve stem 36 is preferably secured to the piston 40 by a stem cap nut 62 that is threaded to the end of the valve stem 36 above the piston 40, compressing a stem O-ring 64 around the valve stem 36 to the top surface of the piston 40. Furthermore, two bellow washers 66 mounted around the valve stem 36 may be secured to the top and bottom surfaces of the piston 40. In a preferred embodiment, a top housing O-ring 68 also seals the threaded interface between the top housing 12 and the valve body housing 14. In a similar manner, a valve mount O-ring 70 seals the interface between the valve body housing 14 and the valve mount 16. A plunger seal 72 provides preferably an O-ring type seal when the plunger 34 is in the closed position and the O-ring is engaged against valve seat 35 to form a hydraulic seal.

Figure 2:
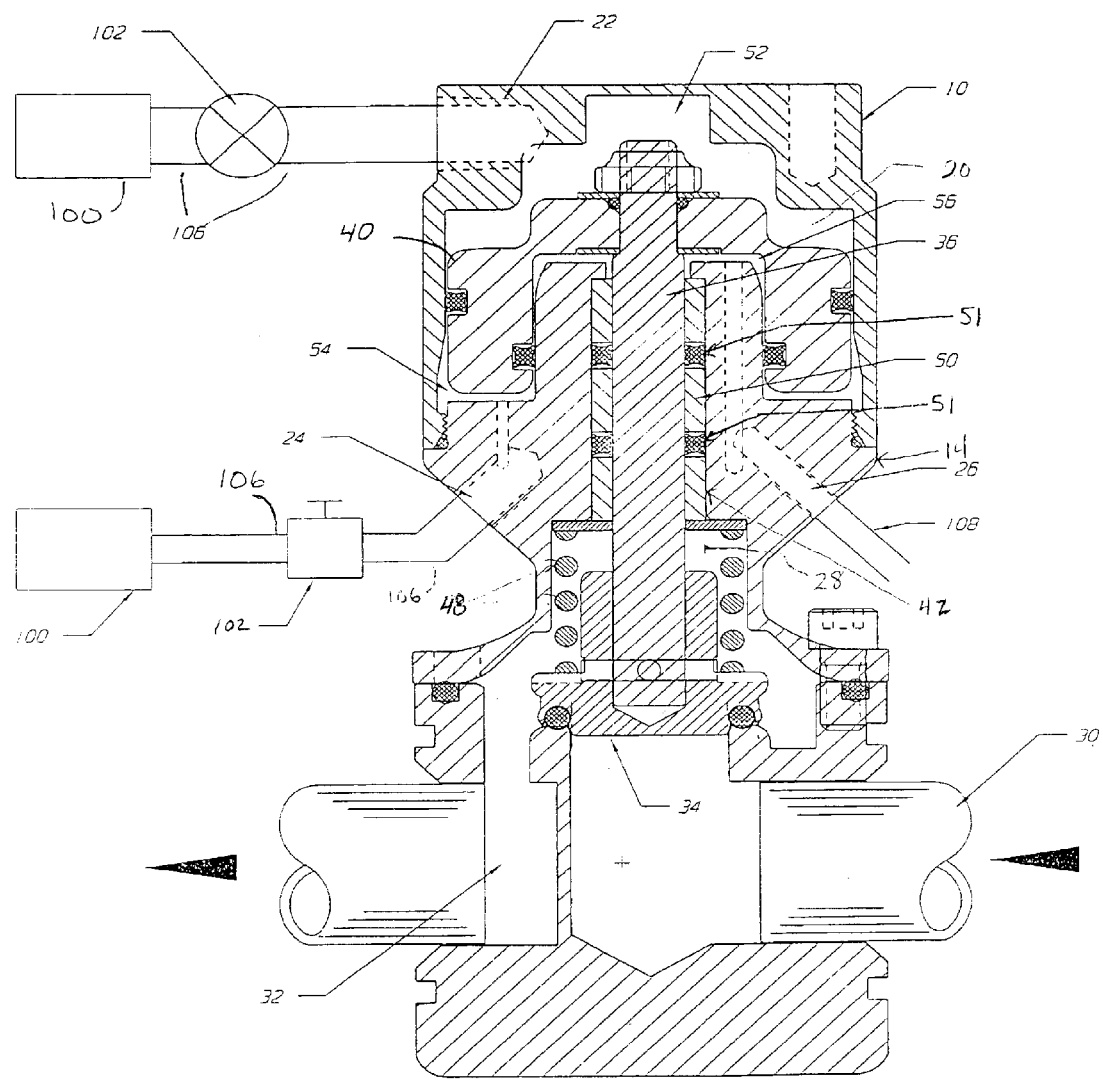
FIG. 2 is an illustration of the valve of FIG. 1 shown connected to a portion of a schematically illustrated hydraulic system and pneumatic control system.

With reference to FIG. 2, the valve 10 of the present invention resists snap-action closure force and provides smooth closing action that can minimize or eliminate water hammer production. The valve 10 is opened and closed by modulating the relative pressures in the upper piston volume 52 and the lower piston volume 54. By offsetting the pressures above and below the piston 40, the net closure force on the valve stem 36 is reduced such that the velocity and acceleration of the valve stem 36 and plunger 34 are small enough to achieve the desired effect of minimizing water hammer. In one embodiment, the upper pressure port 22 and the lower pressure port 24 are supplied from two separate air pressure sources. The separate air pressure sources can consist of, for example, a single pressure source 100, illustrated schematically in FIG. 2, connected to two shut-off valves 102 through separate air pressure lines 106, each shut-off valve 102 being connected to one of the two pressure ports 22 and 24. In a preferred embodiment, the two pressure ports may be supplied from the same air pressure source 100, wherein one of the pressure ports is disconnectable from the pressure source by use of some pressure modulating device, such as, for example, a shut-off valve 102. Where such shut-off valve is used to alter the pressure applied to one of the pressure ports in order to cause a valve transition, activating the shut-off valve preferably releases the pressure applied to one of the pressure ports to ambient air pressure. Subsequent de-activation of the shut-off valve 102 results in repressurization of the connected pressure port and the return of the valve 10 to its original state.

Valve transitions occur when a non-zero net force on the valve stem 36 causes the valve stem 36 and connected plunger 34 to displace in an axial direction defined by the major dimension of the valve stem 36. Pressure in the upper piston volume 52 exerts a force on the top surface of the piston 40 in the downward axial direction (i.e., toward plunger chamber 28); similarly, pressure in the lower piston volume 54 and the vent port volume 56 can exert an axial upward (i.e., toward piston chamber 20) force on the bottom surface of the piston 40. The resultant net force on the piston 40 is transmitted to the plunger 34 via the valve stem 36. If the piston spring 48 is biased under compression, it will exert a downward axial force on the plunger 34. If a pressurized fluid exerts itself against the bottom surface of the plunger 34 when it is in its closed position, this will provide an axial upward force on the plunger 34. Axial displacement of the plunger 34 will result from an imbalance in the net axial force exerted on the plunger, including any other forces such as friction, gravity, etc.

In the preferred embodiment, the valve 10 is normally closed when no pressure is applied to either of the two pressure ports 22 and 24. However, the present invention may be embodied in a normally open valve design, such as by biasing the piston spring 48 under tension instead of under compression. Nevertheless, with reference to the preferred embodiment, which is a normally closed configuration, the plunger 34 is closed in the absence of pressure on the two pressure ports 22 and 24 or pressure at the hydraulic inlet port 30 because the piston spring 48 is under compression to provide a closing force. The plunger 34 will remain in the closed position until, for example, pressurized fluid from the hydraulic inlet port 30 overcomes the closure force from piston spring 48. As described above, pressurizing the upper 22 and lower 24 pressure ports equally results in a net downward force on the valve stem 36 because the top surface area of the piston 40 exposed to the upper piston volume 52 is greater than the bottom surface area of the piston 40 exposed to the lower piston volume 54, the pressure in the vent port volume 56 being preferably at ambient pressure in the steady-state. The bottom surface area of the piston 40 exposed to the unpressurized vent port volume 56 accounts substantially for the difference in surface areas between the pressurized top surface area of the piston 40 and the pressurized bottom surface area of the piston 40. The top surface area of the piston exposed to the upper piston volume 52 may be several times greater than the bottom surface area of the piston exposed to the lower piston volume 54, such as four times, for example. The valve 10 may transition from closed to open, for example, when the pressure in the upper piston volume 52 is reduced relative to the pressure in the lower piston volume 54, such as when pressure in the upper piston volume 52 is vented to ambient pressure level. Reapplying pressure to the upper pressure port 22 will cause the valve 10 to transition back from open to closed.

The closure transition is smooth when the net closure force on the valve stem 36 is small. The valve 10 in accordance with the invention will close smoothly because the pressure in the lower piston volume 54 provides a counteracting force to resist the closure force. A small closure force produces a more gradual displacement of plunger 34. Because the plunger 34 only gradually restricts the flow rate from the hydraulic inlet port 30, snap-action closure does not occur. By resisting a snap-action closure, the valve 10 may reduce or eliminate the generation of water hammer.

A valve 10 in accordance with the present invention may also include a vent port restriction element 104 (not shown) connected to the vent port 26. This restriction element 104 may be, for example, a small aperture (flow restrictor) vent or an adjustable restricted flow valve. Without an attached restriction element, the aperture of the vent port 26 may be any suitable diameter for the intended application, such as approximately 0.044 inches, for example. One purpose of the vent port restriction element 104 is to provide ambient pressure in the vent port volume 56 during steady-state, and to provide resistance to the closure force during transitions. This resistance to a closure force during transitions results from restricting air flow out of the vent port volume 56 during a closure transition. As the increasing pressure in the upper piston volume 52 causes the piston 40 to move downwardly, the effective volume of the vent port volume 56 decreases, causing a corresponding air pressure increase. This increased air pressure will equalize with ambient air pressure rapidly unless the vent port 26 includes a pressure restriction element. If a vent port restriction element 104 is provided, then the vent port volume 56 will experience a transient increase in air pressure during the closure transition until the pressure is able to equalize with ambient air pressure through the restriction element 104. During this transient period, the increased pressure in the vent port volume 56 will exert an upward force on the bottom surface of the piston 40 that opposes its downward movement. This transient upward force opposes the closure force and therefore promotes the desired result of smooth plunger 34 closure.

In one embodiment of the present invention, the valve 10 may not include a vent port 26 such as may be typically formed by machining or drilling holes into the valve body housing 14, as shown in FIG. 1. Instead, other valve constructions in accordance with the present invention may expose a larger portion of the bottom surface of piston 40 to ambient pressure by having more material removed from the valve body housing 14. Removing more material may result in less air flow restriction during valve transitions, and thus provide a decreased resistance to valve closure. Under conditions in which the additional upward resistance provided by restricting air flow out of vent port 26 is not necessary to prevent water hammer, at least the vent port 26, vent port volume 56, and vent port restriction element 104 may not be necessary to practice the present invention.

As an alternative to a restriction element on the vent port, an air flow restriction element may be advantageously incorporated into at least one of the air pressure lines 106 connected to the pressure ports 22 and 24. In a manner similar to the foregoing description, such an airflow restriction element may be arranged to produce a transient reduction in the net closure force on the valve stem 36 and thereby to achieve smooth valve closure. Preferably, such an airflow restriction element permits rapid depressurization of the upper piston volume 52 while preferentially restricting pressurization of the upper piston volume 52: such asymmetric pressurization can provide for rapid opening transitions while ensuring smooth closure transitions to obtain the desired effect of reduced water hammer. Alternatively, an airflow restriction device that preferentially restricts airflow out of the lower piston volume 54 may obtain similar results.

In a further embodiment, either with or without the vent port restriction element 104, the vent port 26 may accept a drain line 108, e.g., a hose, capable of directing any moisture that accumulates in the vent port volume 56 into a desirable location, such as a drip pan. One advantage of the drain line 108 being connected to the vent port 26 is that it allows the detection of failure of the shaft seals 51 in the valve stem channel 42. By monitoring the accumulation of fluid in a drip pan placed in a convenient location, imminent failure of the valve 10 may be detected.

Figure 3:
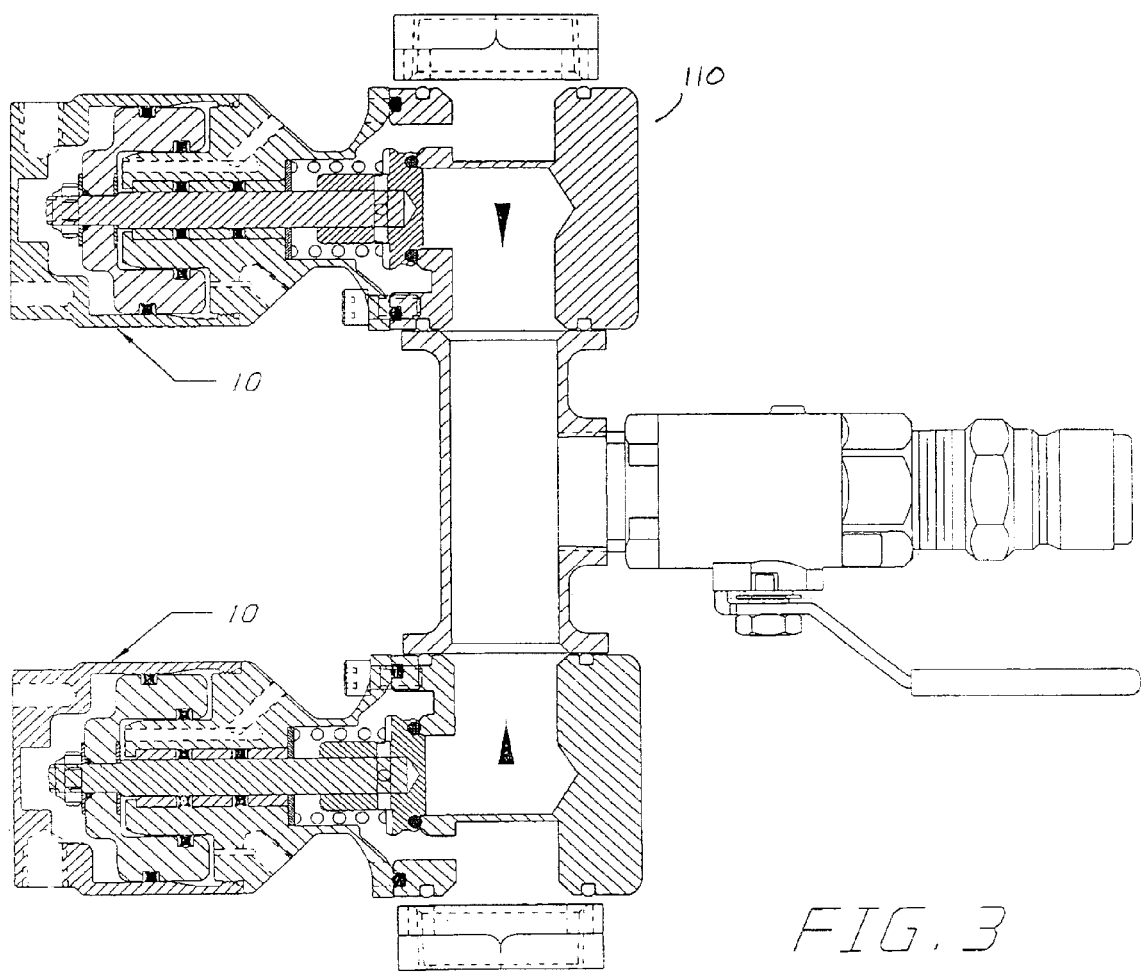
FIG. 3 is a side cross-sectional view of a section of a dual valve and manifold distribution system for controlling the flow of pressurized fluid from two different sources to a hydraulic mid-point connection.

One advantage of the valve of the present invention is the capability to gang a plurality of valves together to control the distribution of fluid flow to or from a channel in a mold, for example. With reference to FIG. 3, a plurality of valves 10 in accordance with the present invention may be connected to a manifold 110. Such a configuration may form a portion of a fluid distribution system. Specifically with reference to the exemplary application of an injection mold temperature control system, it may be appreciated that a manifold 110 connected to a plurality of the valves 10 in accordance with the present invention may be configured to supply, for example, a heat transfer fluid, such as water, to a plurality of channels in a mold (not shown). By way of example, FIG. 3 illustrates a manifold with two valves 10. This configuration is capable of controlling the supply of hot and cold water to a channel in a mold. In this example, it may be further appreciated that an additional manifold with two valves may optionally control the return of the hot and cold water after it passes through the mold channel.

A temperature control system using manifolds 110 with a plurality of pairs of valves 10, each pair of valves 10 as represented in FIG. 3 preferably capable of controlling the flow of hot and cold water to or from a mold channel, may be extended to regulate the temperature in a plurality of channels (not shown) in an injection mold control system. It is evident that the system of the present invention is not limited to the particular configuration illustrated, but is adaptable to any number of valves.

A controller to control a valve in accordance with the present invention may be any suitable commercially available process controller capable of operating shut-off valves to regulate a process temperature. Referring back to FIG. 2, a controller (not shown) may actuate the valves 10 either directly or indirectly. Using direct control, the controller may distribute air from a pressurized source 100 directly to the appropriate pressure ports of a valve 10 to be controlled. Preferably, at least one air pressure line 106 output of the controller may supply an upper pressure port 22 of a valve 10 so that when the controller disconnects pressure from the pressurized source 100 to the upper pressure port 22, the valve 10 transitions from closed to open. The pressurized source 100 may connect directly via a pneumatic control line 106 to the lower pressure port 24 such that when the controller distributes pressurized air to the upper pressure port of valve 10, the upper pressure port 22 and the lower pressure port 24 experience substantially the same pressure such that the valve 10 will transition from open to closed. When the controller disconnects the pressurized source 100 from the upper pressure port 22 and the pressure in the upper piston volume 52 is allowed to vent to ambient pressure, the pressure in the lower piston volume 54 will overcome the reduced pressure in the upper piston volume 52 and produce a transition of valve 10 from closed to open. In this exemplary configuration, the controller may cause adequate depressurization of the upper piston volume 52 by allowing the pressure applied to the upper pressure port 22 to fall to ambient air pressure. However, the pressure in upper piston volume 52 need not fall to ambient to produce a valve transition from closed to open. Depending upon the net force on the valve stem 36, a transition may occur at a pressure in upper piston volume 52 either above or below ambient air pressure.

On the other hand, using indirect control, the controller described above may control the state of at least one valve 102 to control the pressurization of piston volumes 52 and 54. In one embodiment, a valve 102 may be connected between a pressure source 100 and the upper pressure port 22 by air pressure lines 106, as shown in FIG. 2. This valve 102 may be a three-way valve that, in a first state, may permit pressure source 100 to pressurize upper piston volume 52, and, in a second state, may vent upper piston chamber 52 to ambient pressure, and, in a third state, may block all airflow. Optionally, a similar valve 102 may also be connected between pressure source 100 and the lower pressure port 24 by air pressure lines 106.

In a complex system, such as a multiple channel injection mold, water hammer can affect a large number of components via complex interacting mechanisms, and it can thereby lead to an increased probability of system down time. In such a complex system, the cost of down time is magnified by the proportionally larger investment in equipment. A valve in accordance with the present invention can thus save cost and reduce system downtime because the reduced water hammer improves the mean time between failure of the many connected components, including hoses, valves, seals, and pumps in the pressurized hydraulic supply lines. Indeed, the valves themselves realize increased reliability as a result of the reduction or elimination of water hammer. The benefits of this improved system include cost recovery accruing from reduced maintenance, extended service life, and increased productivity.

As used herein, supply refers to a pressurized source of fluid, typically either hot or cold water. Return refers generally to a low pressure hydraulic sink, such that fluid flows from the supply to the return. The exemplary cold supply and cold return hydraulic lines may be connected to a chiller system. The hot water referred to in the exemplary application may be provided by a pressurized hot water heating system. Also, the valve of the present invention may be controlled using vacuum pressures (below ambient) supplied from a pressure source instead of the conventionally positive (above ambient) pressures described in the exemplary embodiments. Although the exemplary embodiments of the present invention refer to air as the ambient and pneumatic gas for control and operation, other gasses known to those skilled in the art as having properties suitable to control and operate the valve may be appropriately substituted.

It is understood that the invention is not limited to the particular embodiments described herein, but embraces all such modified forms thereof as come within the scope of the following claims.

What is claimed is:

1. A valve for controlling flow of a fluid comprising:
   (a) a housing defining a piston chamber, a plunger chamber, and a valve seat in the plunger chamber;
   (b) a piston slideably disposed in the piston chamber;
   (c) a plunger slideably disposed in the plunger chamber for blocking flow of the fluid when the plunger is engaged with the valve seat in the housing;
   (d) a shaft connected to the piston and to the plunger for communicating axial motion from the piston to the plunger;
   (e) a fluid outlet port in the housing that is in fluid communication with the plunger chamber;
   (f) a fluid inlet port in the housing that is in fluid communication with the plunger chamber when the piston is upwardly disposed and the plunger is disengaged from the valve seat and wherein the plunger blocks such fluid communication when the piston is downwardly disposed and the plunger is engaged with the valve seat;
   (g) piston seals defining an upper piston volume in the piston chamber above the piston, a lower piston volume in the piston chamber below the piston, and a vent port volume in the piston chamber below the piston;

(h) an upper pressure port in the housing that is in fluid communication with the upper piston volume;

(i) a lower pressure port in the housing that is in fluid communication with the lower piston volume; and, (j) a vent port in the housing that is in fluid communication with the vent port volume.

2. The valve of claim 1 wherein the piston is slideably responsive to pressure changes in the upper piston volume and lower piston volume, the piston slides to an upwardly disposed position when the net upward force on the piston exceeds the net downward force on the piston, and the piston slides to a downwardly disposed position when the net downward force on the piston exceeds the net upward force on the piston.

3. The valve of claim 2 wherein the surface area of the top of the piston exposed to the upper piston volume exceeds the surface area of the bottom surface of the piston exposed to the lower piston volume.

4. The valve of claim 2 wherein the upper pressure port and the lower pressure port are pressurized to an above-ambient pressure level.

5. The valve of claim 2 further comprising a spring disposed around the shaft, wherein the spring biases the piston and plunger to the downwardly disposed position.

6. The valve of claim 5 wherein the piston is in the downwardly disposed position when the pressure in the upper piston volume is substantially equal to the pressure in the lower piston volume, the piston transitions to the upwardly disposed position whenever and so long as the pressure in the upper piston volume is substantially reduced relative to the pressure in the lower piston volume, and the piston returns to the downwardly disposed position whenever the pressure in the upper piston chamber is made substantially equal to the pressure in the lower piston chamber.

7. The valve of claim 1 further including a resilient seal on the plunger that engages with the valve seat in the closed position of the plunger.

8. The valve of claim 1 further including an air flow restrictor connected to the upper pressure port to restrict the rate at which air can flow into the upper piston volume.

9. The valve of claim 1 further including an air flow restrictor connected to the lower pressure port to restrict the rate at which air can flow out of the lower piston volume.

10. The valve of claim 1 further including an air flow restrictor connected to the vent port to restrict the rate at which air can flow out of the vent port volume.

11. The valve of claim 1 wherein the vent port volume is defined by inner walls of the piston forming an inner chamber within the piston and a section of the housing that extends into the inner chamber of the piston.

12. The valve of claim 1 wherein the vent port is in fluid communication with ambient air pressure.

13. The valve of claim 12 further including a drain line connected to the vent port to drain fluid in the vent port volume to an external location.

* * * * *